United States Patent [19]

Wagner

[11] 4,187,356

[45] Feb. 5, 1980

[54] CONDENSATION OF FORMALDEHYDE HYDRATE TO FORM MIXTURES WHICH, TOGETHER WITH MONOMERS CAPABLE OF AMINOPLAST FORMATION ARE USEFUL IN THE PREPARATION OF POLYURETHANE FOAMS

[75] Inventor: Kuno Wagner, Leverkusen, Fed. Rep. of Germany

[73] Assignee: Bayer Aktiengesellschaft, Leverkusen, Fed. Rep. of Germany

[21] Appl. No.: 934,649

[22] Filed: Aug. 17, 1978

Related U.S. Application Data

[63] Continuation-in-part of Ser. No. 829,173, Aug. 30, 1977.

[30] Foreign Application Priority Data

Aug. 26, 1977 [DE] Fed. Rep. of Germany ....... 2738532

[51] Int. Cl.² ............................................. C08G 18/14
[52] U.S. Cl. ..................................... 521/158; 127/30; 127/31; 252/182; 260/594; 260/602; 427/425; 521/163; 521/166; 528/230; 528/254; 528/259; 536/1

[58] Field of Search ..................... 536/1; 127/30, 31; 528/254, 259, 230; 252/182; 521/158, 163, 166; 427/425; 260/594, 602

[56] References Cited

U.S. PATENT DOCUMENTS

| 2,269,935 | 1/1942 | Hanford et al. ...................... 260/602 |
| 2,272,378 | 2/1942 | Lorand ................................. 260/602 |
| 2,760,983 | 8/1956 | MacLean et al. .................... 260/602 |
| 3,434,982 | 3/1969 | Kaiser et al. ......................... 521/166 |

OTHER PUBLICATIONS

Partridge et al., *Carbohydrate Research* 24, 1972, pp. 29-44.

*Primary Examiner*—Maurice J. Welsh
*Attorney, Agent, or Firm*—Gene Harsh; Joseph C. Gil

[57] ABSTRACT

This invention relates to mixtures of formose, aminoplast monomers and optionally water and/or crystalline mono or disaccharides. The mixtures are relatively low viscosity liquids at room temperature. The invention also relates to the use of such mixtures for the production of polyurethane resins, in particular foam resins.

24 Claims, No Drawings

CONDENSATION OF FORMALDEHYDE HYDRATE TO FORM MIXTURES WHICH, TOGETHER WITH MONOMERS CAPABLE OF AMINOPLAST FORMATION ARE USEFUL IN THE PREPARATION OF POLYURETHANE FOAMS

This application is a continuation-in-part application of Ser. No. 829,173, filed Aug. 30, 1977.

BACKGROUND OF THE INVENTION

The term "formose" in the context of the present invention, means the known mixtures of low molecular weight polyhydroxyl compounds (polyhydric alcohols, hydroxyaldehydes and hydroxyketones) which are obtained from the condensation of formaldehyde hydrate.

The preparation of mixtures of polyhydric alcohols, hydroxyaldehydes and hydroxyketones by the autocondensation of formaldehyde hydrate has been described in the literature, for example by Butlerow and Loew, in Annalen 120, 295 (1861) and J.pr.Chem. 33, 321 (1886); Pfeli, chemishce Berichte 84, 229 (1951); Pfeil and Schroth, chemische Berichte 85, 303 (1952); R. D. Partridge and A. H. Weiss, Carbohydrate Research 24, 29-44 (1972); the formoses of glyceraldehyde and dihydroxyacetone according to Emil Fischer, German Pat. Nos. 822,385; 830,951 and 884,794 and U.S. Pat. Nos. 2,224,910, 2,269,935 and 2,272,378 and British Pat. No. 513,708. These known processes however, have certain disadvantages such as toxicologically harmful catalysts, poor volume/time yields and colored by-products. New processes have recently been developed by which virtually colorless formoses which are free from unwanted by-products can be obtained in high yields with the aid of conventional catalysts.

According to one of these new processes, the condensation of formaldehyde hydrate is carried out in the presence of catalysts consisting of soluble or insoluble lead(II) salts or of lead(II) ions bound to high molecular weight carriers, and is the presence of a cocatalyst which consists of a mixture of hydroxyaldehydes and hydroxyketones such as can be obtained from the condensation of formaldehyde hydrate and which is characterized by the following molar ratios:

Compounds with 3 carbon atoms/compounds with 4 carbon atoms: 0.5:1 to 2.0:1
Compounds with 4 carbon atoms/compounds with 5 carbon atoms: 0.2:1 to 2.0:1
Compounds with 5 carbon atoms/compounds with 6 carbon atoms: 0.5:1 to 5.0:1.

The proportion of components having from 3 to 6 carbon atoms is at least 75% by weight, preferably more than 85% by weight, based on the total quantity of cocatalyst.

The reaction temperature used is generally from 70° C. to 110° C., preferably from 80° C. to 100° C. The pH of the reaction solution is initially adjusted to 6.0 to 8.0, preferably 6.5 to 7.0 by controlled addition of an inorganic or organic base until 10 to 60%, preferably 30 to 50% of the starting materials have been converted. Thereafter the pH is adjusted to 4.0 to 6.0, preferably 5.0 to 6.0. It was surprisingly found that by controlling the pH in this special manner and subsequently cooling at various different residual formaldehyde contents (0 to 10% by weight, preferably 0.5 to 6% by weight), the distribution of products in the polyol, hydroxyaldehyde and hydroxyketone mixtures could be varied in a reproducible manner.

When the autocondensation of formaldehyde hydrate has been stopped by cooling and/or by inactivation of the lead catalyst with acids, the catalyst may be removed in known manner and the water contained in the products evaporated off. Details of this procedure may be found in German Offenlegungsschrift No. 2,639,084.

Another possible method for preparing highly concentrated colorless formoses with high volume/time yields consists of condensing aqueous formalin solutions and/or paraformaldehyde dispersions in the presence of a soluble or insoluble metal catalyst and of a cocatalyst which has been prepared by partial oxidation of a dihydric or higher hydric alcohol containing at least two adjacent hydroxyl groups and having a molecular weight of between 62 and 242 or a mixture of such alcohols. The pH of the reaction solution is kept between 6.0 and 9.0 by controlled addition of a base until 5 to 40% conversion is obtained. Thereafter, the reaction solution pH is adjusted to between 4.5 and 8.0 until the condensation reaction is stopped. During this letter phase of the reaction the pH is 1.0 to 2.0 units lower than during the first phase of the reaction. The reaction is stopped at a residual formaldehyde content of 0 to 10% by weight by inactivating the catalyst. The catalyst is then removed. This method has been described in detail in German Offenlegungsschrift No. 2,713,084.

High quality formoses can also be obtained by the condensation of formaldehyde in the presence of a metal catalyst and more than 10% by weight, based on formaldehyde, of one or more di- or poly-hydric low molecular weight alcohols and/or higher molecular weight polyhydroxyl compounds. Formosepolyol mixtures of this kind are described in German Offenlegungsschrift No. 2,714,104.

It is particularly economical to prepare formose directly from formaldehyde-containing synthesis gases, i.e. without first preparing aqueous formalin solutions or paraformaldehyde. In order to obtain formoses by this method, the synthesis gases obtained from the large scale industrial production of formaldehyde are fed continuously or intermittently at temperatures of between 10 and 150° C. into an absorption liquid consisting of water, mono- or poly-hydric low molecular weight alcohols and/or higher molecular weight polyhydroxyl compounds and/or compounds capable of enediol formation as cocatalysts. The absorption liquid may contain soluble or insoluble metal compounds as catalysts (optionally bound to high molecular weight carriers) and has a pH of from 3 to 10. The formaldehyde is condensed in situ in the absorption liquid (or optionally in a reaction tube or cascade of stirrer vessels following the absorption liquid). The autocondensation of the formaldehyde is stopped by cooling and/or by inactivation of the catalyst with acids when the residual formaldehyde content in the reaction mixture has fallen to 0-10% by weight. The catalyst is finally removed. Further details of this process may be found in German Offenlegungsschriften Nos. 2,721,093 and 2,721,186.

Formoses prepared by this process may subsequently be converted into their hemiacetals with excess formaldehyde or they may be amethylolated by reacting them with formaldehyde in the presence of bases. Modified formoses of this kind have also been described in some detail in German Offenlegungsschrift No. 2,721,186 and are also included in the term "formose" in the context of the present invention.

The properties of the formoses (average hydroxyl functionality, degree of branching, proportion of reducing groups) can be varied within wide limits by controlling the reaction conditions of formaldehyde condensation. As a general rule, the further the stage to which the condensation reaction is continued (i.e. the lower the residual formaldehyde content when the condensation reaction is stopped) the higher is the average molecular weight and hence the hydroxyl functionality of the formoses obtained. If the condensation reaction is continued to a residual formaldehyde content of from 0 to 1.5% by weight, a formose which contains approximately 25% by weight of constituents with 5 carbon atoms, 45% by weight of compounds with 6 carbon atoms and approximately 20% by weight of compounds with 7 or more carbon atoms is obtained. At the same time, a total of only about 10% of polyols, hydroxyketones and hydroxyaldehydes having 2, 3 and 4 carbon atoms is obtained. This corresponds to an average hydroxyl functionality of about 5.

If formaldehyde autocondensation is stopped at somewhat higher residual formaldehyde contents, the distribution of components in the starter mixture obtained is different. When the condensation reaction is stopped at a formaldehyde content of from 2 to 2.5%, for example, a mixture of higher hydric alcohols, hydroxyaldehydes and hydroxyketones having an average hydroxyl functionality of approximately 4 is obtained. Other distributions of components, with much lower hydroxyl functionalities, are obtained when the condensation reaction is stopped at residual formaldehyde contents higher than 2.5.

The functionality of the products may be varied even further in the desired direction by mixing the formoses with difunctional or higher functional low molecular weight alcohols. Low molecular polyhydric alcohols with molecular weights up to about 300 suitable for this purpose include, for example, ethylene glycol, propane-1,2-diol, propane-1,3-diol, butane-1,4-diol, diethyleneglycol, dipropyleneglycol, triethylene glycol, tetraethyleneglycol, dibutyleneglycol, glycerol, trimethylolpropane, pentaerythritol, sorbitol, butanetriols and hexanetriols as well as ethoxylation products of these alcohols and hydrogenated formoses (formite). Amines and/or ethanolamines may also be used in the mixtures. Examples of such amines and ethanolamines include mono-, di- and triethanolamine, mono-, di and triisopropanolamine, N-alkanolamines such as N-methyldiethanolamine and N-ethyldiethanolamine as well as lower aliphatic monoamines and polyamines such as ethylamine, ethylene diamine, diethylenetriamine and triethylenetetramine.

According to an earlier proposal described in German Offenlegungsschriften Nos. 2,639,084, 2,714,084 and 2,714,104, formoses may be used as polyol components in the polyisocyanate polyaddition process for the production of polyurethane resins.

DESCRIPTION OF THE INVENTION

It has now been found that polyurethane resins, particularly foam resins, can be produced with exceptionally high flame resistance by this method if, instead of using pure formoses as starting components, a mixture of formoses and aminoplast monomers is used. Such mixtures have a surprisingly low viscosity compared with pure formoses. This is a great practical advantage because it means that the mixtures can be easily dosed. Moreover, the mixtures of formoses with monomers which are capable of aminoplast formation surprisingly have the capacity of dissolving large quantities of crystallized sugars (mono- and/or disaccharides). They can also be mixed with large amounts of waterglass.

The present invention thus relates to isocyanate reactive mixtures comprising (a) 10 to 95% by weight, preferably 20 to 80% by weight (based on (a)+(b)+(c)) of a mixture of polyhydric alcohols, hydroxyaldehydes and hydroxyketones which has been obtained by the condensation of formaldehyde hydrate, (b) 5 to 80% by weight, preferably 20 to 70% by weight (based on (a)+(b)+(c)) of monomers which are capable of aminoplast formation or their N-methylolation products, (c) 0 to 80% by weight, preferably 0.3 to 50% by weight, and most preferably 0.8 to 35% by weight (based on (a)+(b)+(c)) of water and (d) 0 to 100% by weight, preferably 10 to 50% by weight (based on (a)+(b)+(c)) of mono- and/or disaccharides, the weight ratio of components (a) to (b) preferably being between 20:1 and 1:2, most preferably between 10:1 and 1:1.

The mixtures according to the invention preferably contain from 0.3 to 10 mol, most preferably 1 to 5 mol of water per mol of formoses and from 0.5 to 6 mol, most preferably 1 to 3 mol of the aminoplast monomer per mol of formoses.

Any formoses may theoretically be used for the mixtures according to the invention but for the preferred application which is the production of polyurethane resins, it is preferable to use those formoses which have been produced by the more recent processes described above because these are generally colorless and free from unwanted by-products. It is preferred to use formoses which have an average molecular weight of between 92 and 360, most preferably between 100 and 240, and a sugar content, calculated as glucose with a molecular weight of 180, of from 4 to 85% by weight, most preferably from 6 to 78% by weight. Moreover, for certain purposes it is preferred to use formoses which, as described above, have been α-aldolized by subsequent treatment with formaldehyde at a basic pH range because such formoses contain a higher proportion of primary hydroxyl groups. For the purpose of the invention there may, of course, also be used formoses which have been converted into hemiacetals by reaction with formaldehyde after their preparation, or formoses which have undergone intermolecular or intramolecular acetalization or ketalization by subsequent treatment with acids, or formoses which have been modified by the addition of carbonyl compounds which have no hydroxyl group on the α-carbon atom, or formoses which have been modified by the Maillard reaction, by acyloin condensation in the presence of cyanides or by means of phenoplast formers. All of these modified formoses have been described in detail, for example, in German Offenlegungsschrift No. 2,721,186.

Any known compound capable of aminoplast formation may be used as component b) in the mixtures according to the invention, for example the compounds described in U.S. patent application Ser. No. 464,099 of Apr. 25, 1977 which corresponds to British Pat. No. 1,462,292 and U.S. patent application Ser. No. 886,316 of Mar. 13, 1978 which corresponds to German Offenlegungsschrift No. 2,713,198. It is generally preferred to use the N-methylolation products of these compounds because they are more easily built into the polyurethane resins in the reaction with polyisocyanates.

The following aminoplast monomers are preferred according to the invention: Urea, symmetrically or asymmetrically substituted ureas such as N,N-dimethyl (or -diethyl or -dibutyl)-urea, thiourea, guanidine, dicyandiamide, melamine, oxamide, ethyleneurea, ε-caprolactam, pyrrolidone-(2), aniline, acetylenediurein and the N-methylol compounds of all of these monomers. Particularly preferred for the invention are urea, N-monomethylolurea, N,N'-dimethylolurea, thiourea, N-monomethylolthiourea, N,N'-dimethlolthiourea, ε-caprolactam and N-methylol-ε-caprolactam.

As already mentioned above, it has been surprisingly found that the mixtures according to the invention are capable of dissolving relatively large quantities of crystallized mono- and disaccharides such as glucose, maltose, sucrose, natural invert sugar (for example pure honey) or artifical invert sugar such as hydrolysates of sucrose, corn and potato starch degraded enzymatically or by hydrolysis, hydrolysates of pectins (amyloses and amylopectins) or hydrolysates of any other di- and/or polysaccharides, e.g. of trehalose, galactose, raffinose, cellulose or dextrins. This is very interesting from a commercial standpoint because such crystallized mono- and di-saccharides are difficult to react with polyisocyantes when in the pure form.

The mixtures according to the invention are obtained, for example, when formaldehyde condensation is carried out by the process described above in the presence of aminoplast monomers. It is to be regarded as extremely surprising that the mixtures according to the invention are obtainable by this route since it is well known that, in the presence of water and formaldehyde, aminoplast formers are in equilibrium with the corresponding N-methylol compounds. These methylation products are highly reactive compounds and give rise to various condensation reactions in both neutral and acid or basic media even at room temperature to form crosslined or linear polycondensates (polymethyleneureas) which are completely insoluble in water. Numerous possible condensation reactions of methylolated aminoplast formers have been described, for example by H. Staudinger and K. Wagner in "Die Makromolekulare Chemie", No. 3 (Volume XII), pages 168 to 235. It was therefore not expected that the formation of formoses would proceed unhindered in the presence of such N-methylolated aminoplast monomers and that mixtures of formoses with substantially unchanged aminoplast formers would be obtained. At the end of the reaction, the aminoplast formers are present either in their natural state or still in the form of their N-methylol derivatives, depending on the degree of conversion to which the formaldehyde autocondensation was continued. It is, of course, possible to continue the condensation of formaldehyde to 100% conversion and subsequently to reconvert the aminoplast monomers in the reaction product into N-methylolation products by the addition of formaldehyde.

The present invention thus also relates to a process for the conversion of formaldehyde into a mixture of low molecular weight, polyhydric alcohols, hydroxyaldehydes and hydroxyketones by condensing aqueous formalin solutions and/or paraformaldehyde dispersions containing from 20 to 65% by weight of formaldehyde at pH values of between 4 and 9, preferably between 5 and 8 and at reaction temperatures of from 70° to 110° C. in the presence of soluble or insoluble salts of metals of the 2nd to 4th Main Group or 1st to 8th sub-Group of the Periodic System of Elements or in the presence of metal ions bound to a high molecular weight carrier, and in the presence of a cocatalyst based on compounds which are capable of enediol formation, wherein the condensation reaction is carried out in the presence of preferably 0.1 to 3 mol, based on 1 mol of formaldehyde, of compounds capable of aminoplast formation. If desired, excess water is subsequently removed in known manner.

The mixtures of formose and aminoplast formers according to the invention may also be prepared by stopping the condensation of formaldehyde to formose at a conversion of only 40 to 95%, preferably 70 to 90%, based on the formaldehyde put into the process, and then, preferably after inactivation of the formose catalyst, removing the residual formaldehyde by N-methylolation brought about by the addition of compounds which are capable of aminoplast formation, preferably at pH values of between 7 and 9.

The invention therefore also relates to a process for the preparation of mixtures of formoses and aminoplast monomers wherein aqueous formalin solutions and/or paraformaldehyde dispersions containing from 20 to 65% by weight of formaldehyde are condensed to mixtures of low molecular weight polyhydric alcohols, hydroxyaldehydes and hydroxyketones until 40 to 95%, preferably 70 to 90% of the formaldehyde put into the process has been converted. This condensation is carried out at pH values of between 4 and 9, preferably between 5 and 8, at a reaction temperature of from 70° to 110° C. in the presence of soluble or insoluble salts of metals of the 2nd to 4th Main Group or the 1st to 8th sub-Group of the Periodic System of Elements or in the presence of metal ions bound to a high molecular weight carrier and in the presence of a cocatalyst based on compounds which are capable of enediol formation. The residual formaldehyde is thereafter bound by N-methylolation by the addition of compounds which are capable of aminoplast formation. If desired, excess water present in the reaction product is subsequently removed in known manner.

It is, of course, also possible to prepare the mixtures according to the invention by introducing the compounds capable of aminoplast formation of their N-methylol derivatives into a formaldehyde-free aqueous formose solution which may have been prepared by any method. Optionally aqueous formaldehyde is then added in order to N-methylolate the aminoplast monomers. The excess water is removed, for example in a thin layer evaporator at a vacuum of from 1 to 18 Torr and a temperature of between 35° C. and 60° C.

This invention therefore also relates to a process for the preparation of the mixtures of formoses and aminoplast formers, where the compounds capable of aminoplast formation or their N-methylol compounds are dissolved in an aqueous solution of a mixture of low molecular weight polyhydric alcohols, hydroxyaldehydes and hydroxyketones. This mixture has been obtained by the autocondensation of formaldehyde hydrate, or conversely, formaldehyde is optionally added in order to convert the compounds which are capable of aminoplast formation into their N-methylol derivatives. If desired, excess water present is subsequently removed in known manner.

If the aminoplast monomers are subsequently N-methylolated, this last mentioned process is preferably carried out at a pH of between 7 and 9, most preferably at pH 7.5 to 8, and at temperatures of between 10° and 65° C., most preferably at 20° to 50° C.

In similar manner, the crystalline sugars described above may be introduced into the mixture according to the invention by dissolving them in the aqueous formose solutions before or after addition of the aminoplast monomer.

It has been found that the products obtained vary in their viscosity depending on the conditions employed for treating the formose/aminoplast monomer mixtures, particularly the treatment at the dehydration stage. If the mixtures are carefully dehydrated, e.g. by means of a thin-film evaporator, preferably after removal of the metal ions left behind from the catalyst used for formaldehyde condensation, the resulting mixtures according to the invention generally have an extremely low viscosity. Virtually no chemical reaction has taken place between the aminoplast former and the hydroxyl or carbonyl groups of the formose.

When the mixtures according to the invention are concentrated by evaporation at temperatures of 50° to 60° C. and at a basic pH of 7.5 to 9, in the presence of formose metal catalysts, formose-aminoplast monomer mixtures which are free from N-methylol groups undergo no significant change although in the final phase of the reaction, as the water content of the solution decreases, dehydration reactions of the formose and condensations of the carbonyl groups of the formose with the aminoplast monomers take place as side reactions which darken the color of the mixtures (Maillard reactions and for the most part unknown condensation and rearrangement reactions).

If the mixtures of the invention contain N-methylolaminoplast monomers and formose metal catalysts at pH values of from 7.5 to 9, the formation of formose from the formaldehyde which has been split off from the N-methylol groups again takes place if dehydration is prolonged. In addition, soluble aminoplast monomers which contain N-methylene ether groups are formed, e.g. aminoplast monomers having structural units represented by the following formula:

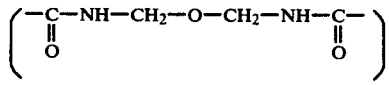

The formation of these monomers is again accompanied by side reactions such as the dehydration of formoses, condensations of their carbonyl groups with the aminoplast monomers and unknown splitting reactions of the formoses, accompanied by dark discoloration.

In the case of mixtures containing, for example, methylol compounds of urea, thiourea, dicyandiamide or melamine, dehydration of the mixtures according to the invention in a strongly acid range of pH 1 to 2 leads to insoluble, cross-linked aminoplast condensates.

For these reasons, it is preferred to dehydrate the mixtures according to the invention at a neutral to slightly acid pH (pH 4.9 to 7) and only after removal of the metal catalysts.

On the other hand, the N-methylol groups of the aminoplast former may be deliberately linked to the hydroxyl groups of the formoses to form methylene ether groups by acid catalysis.

Thus, for example, using a sufficient excess of formoses and optionally other monohydric and polyhydric alcohols, methylol-containing aminoplast monomers and methylol-containing oligomers of the aminoplasts, which oligomers are formed by dehydration with elimination of water, may be etherified with the hydroxyl groups of the formoses or alcoholic mixtures thereof. The reaction is preferably carried out at pH 2 to 5.5 in the presence of inorganic or organic acids as catalysts and at temperatures of from 30° to 100° C., optionally under conditions of dehydration under vacuum (see Example 10).

The O- N-aminals obtained in this way are particularly suitable as additives for higher molecular weight polyhydroxyl compounds to improve their compatibility with each other and with other components of a polyurethane formulation.

These mixtures which are modified by partial condensation between the carbonyl or hydroxyl groups of the formoses and the aminoplast formers, and the use of these mixtures as starting components for the production of polyurethane resins also fall within the scope of the present invention.

It has surprisingly been found that the mixtures according to the invention are also capable of holding in solution relatively large quantities (up to 20% by weight, preferably 5 to 15% by weight) of calcium formate, which is only sparingly soluble in water. It is therefore not necessary to remove the calcium ions from formoses which have been prepared with the aid of calcium hydroxide as catalyst. This is important for economical reasons. Moreover, such formose mixtures which contain calcium formate are more highly reactive with polyisocyanates.

Aluminum hydroxide may also be stirred into the mixtures of the invention in proportions of up to 150% by weight, preferably from 10 to 100% by weight, based on the mixture of formoses, aminoplast monomers and water. Stable, non-sedimenting pasty dispersions are thereby obtained. These dispersions are eminently suitable for the production of polyurethane foams containing fillers.

The main contemplated use for the mixtures of the invention lies in the production of highly frame-resistant polyurethane resins, particularly polyurethane foam resins.

The present invention therefore also relates to a process for the production of cellular or non-cellular polyurethane resins by the reaction of (A) Polyisocyanate with (B) polyhydroxyl compounds having a molecular weight below 400, and optionally (C) polyhydroxyl compounds having a molecular weight between 400 and 10,000 and optionally other isocyanate reactive compounds, optionally in the presence of (D) blowing agents, catalysts, fillers and other known additives, wherein the mixtures according to the invention are used as component (B).

The mixtures according to the invention generally contain substantial quantities of water since complete removal of water from formose mixtures could be prohibitively expensive. The mixtures of the invention are therefore particularly suitable for the production of polyurethane foams. Both open celled and closed celled rigid polyurethane foams as well as open celled flexible foams may be produced.

For the production of open celled rigid foams, it is suitable to use those formose/aminoplast monomer mixtures which contain between 4 and 25% by weight, preferably between 8 and 20% by weight of water. The suspensions of aluminum hydroxide described above or of other mineral fillers may be used, if desired. A higher molecular weight polyhydroxyl compound having a molecular weight of approximately 400 to 10,000 may also be added in quantities of up to 100% by weight, preferably 10 to 50% by weight, based on the whole quantity of polyol component. The quantity of polyisocyanate in the formulation may vary within wide limits. The polyisocyanate may be used in excess, suitably up to 120% of the calculated equivalent quantity, or in less than the equivalent quantity. It was found, however, that the smaller the isocyanate index (i.e., the equivalent ratio of polyisocyanates to isocyanate reactive compounds), in the formulation, the higher is the flame resistance obtained in the resulting foams. It is therefore preferred to operate with indices within the range of 20 to 70, most preferably 30 to 60 and particularly 35 to 55.

For the production of closed celled rigid foams, it is preferable to use mixtures of the invention which contain from 0 to 4% by weight, and most preferably from 0.7 to 3% by weight of water. Foaming in such a case is brought about by the addition of low boiling liquid blowing agents such as fluorotrichloromethane. With regard to the isocyanate index of the formulations, what has been said above in connection with open celled rigid foams also applies here.

If desired, however, the mixtures according to the invention may be used in proportions of 5 to 30% by weight, preferably 5 to 20% by weight, based on the total polyol component, as cross-linking agents for the production of open celled flexible foams. The remainder of the polyol component in this case consists of polyhydroxyl compounds with molecular weights from 400 to 10,000, preferably polyether polyols with molecular weights of from 1000 to 6000. The formulations preferably contain a total of 2.5 to 6% by weight, most preferably 3 to 5% by weight, based on the polyol component, of water. An index of from 70 to 130, most preferably 90 to 120, is used.

The isocyanate components used for the production of the cellular or non-cellular polyurethane resins may be aliphatic, cycloaliphatic, araliphatic, aromatic or heterocyclic polyisocyanates such as those described, for example, by W. Siefken in Justus Liebigs Annalen der Chemie, 562, pages 75 to 136. These include, for example, ethylene diisocyanate, tetramethylene-1,4-diisocyanate, hexamethylene-1,6-diisocyanate, dodecane-1,12-diisocyanate, cyclobutane-1,3-diisocyanate, cyclohexane-1,3- and -1,4-diisocyanate and any mixtures of these isomers, 1-isocyanato-3,3,5-trimethyl-5-isocyanatomethyl-cyclohexane as described in German Auslegeschrift No. 1,202,785 and U.S. Pat. No. 3,401,190, hexahydrotolylene-2,4-diisocyanate and -2,6-diisocyanate and any mixtures of these isomers, hexahydrophenylene-1,3-diisocyanate and/or 1,4-diisocyanate, perhydrodiphenylmethane-2,4'-diisocyanate and/or 4,4'-diisocyanate, phenylene-1,3-diisocyanate and -1,4-diisocyanate, tolylene-2,4-diisocyanate and -2,6-diisocyanate and any mixtures of these isomers, diphenylmethane-2,4'-diisocyanate and/or 4,4'-diisocyanate, naphthylene-1,5-diisocyanate, triphenylmethane-4,4',4"-triisocyanate, polyphenyl-polymethylene polyisocyanates which can be obtained by aniline-formaldehyde condensation followed by phosgenation and which have been described, for example, in British Pat. Nos. 874,430 and 848,671, m- and p-isocyanatophenyl-sulphonyl isocyanates according to U.S. Pat. No. 3,454,606, perchlorinated aryl polycyanates such as those described, for example, in German Auslegeschrift No. 1,157,601 and U.S. Pat. No. 3,277,138, polyisocyanates with carbodiimide groups as described in German Pat. No. 1,092,007 and U.S. Pat. No. 3,152,162, diisocyanates of the kind described in U.S. Pat. No. 3,492,330, polyisocyanates with allophanate groups as described e.g. in British Pat. No. 994,890, Belgian Pat. No. 761,626 and published Dutch Patent Application 7,102,524, polyisocyanates with isocyanurate groups, e.g. as described in U.S. Pat. No. 3,001,973, German Pat. Nos. 1,022,789; 1,222,067 and 1,027,394 and German Offenlegungsschriften Nos. 1,929,034 and 2,004,048, polyisocyanates with urethane groups as described e.g. in Belgian Pat. No. 752,261 or U.S. Pat. No. 3,394,164, polyisocyanates with acylated urea groups according to German Pat. No. 1,230,778, polyisocyanates with biuret groups as described e.g. in German Pat. No. 1,101,394, U.S. Pat. Nos. 3,124,605 and 3,201,372, and British Pat. No. 889,050, polyisocyanates prepared by telomerization reactions as described, for example in U.S. Pat. No. 3,654,106, polyisocyanates with ester groups such as those mentioned, for example, in British Pat. Nos. 965,474 and 1,072,956, U.S. Pat. No. 3,567,763 and German Pat. No. 1,231,688, reaction products of the above mentioned isocyanates with acetals according to German Pat. No. 1,072,385 and polyisocyanates containing polymeric fatty acid groups according to U.S. Pat. No. 3,455,883.

The distillation residues obtained from the commercial production of isocyanates and still containing isocyanate groups may also be used, optionally as solutions in one or more of the above mentioned isocyanates. Any mixtures of the above mentioned polyisocyanates may also be used.

As a general rule it is particularly preferred to use commercially readily available polyisocyanates such as tolylene-2,4-diisocyanate and —2,6-diisocyanate and any mixtures of these isomers ("TDI"); polyphenyl-polymethylene polyisocyanates of the kind which can be prepared by aniline-formaldehyde condensation followed by phosgenation ("Crude MDI"); and polyisocyanates containing carbodiimide groups, urethane groups, allophanate groups, isocyanurate groups, urea groups or biuret groups ("modified polyisocyanates").

The starting components with at least two isocyanate reactive hydrogen atoms and a molecular weight of 400 to 10,000, which may also be used according to the invention for the production of polyurethane resins may be compounds containing amino groups, thiol groups or carboxyl groups but are preferably polyhydroxyl compounds, in particular compounds having from 2 to 8 hydroxyl groups, and particularly those with a molecular weight of from 800 to 10,000 and preferably 1000 to 6000. Examples include polyesters, polyethers, polythioethers, polyacetals, polycarbonates and polyester amides having at least 2, generally, 2 to 8, but preferably 2 to 4 hydroxyl groups, of the kind known per se for the production of both homogeneous and cellular polyurethanes.

Suitable polyesters with hydroxyl groups include e.g. reaction products of polyvalent, preferably divalent alcohols, to which trivalent alcohols may be added, and polyvalent, preferably divalent carboxylic acids. Instead of free polycarboxylic acids, the corresponding polycarboxylic acid anhydrides or corresponding polycarboxylic acid esters of lower alcohols or mixtures thereof may, of course, be used for preparing the polyesters. The polycarboxylic acids may be aliphatic, cycloaliphatic, aromatic and/or heterocyclic and they may be substituted, e.g. by halogen atoms, and/or unsaturated.

The following are mentioned as examples: Succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids such as oleic acid optionally mixed with monomeric fatty acids, dimethyl terephthalate and terephthalic acid-bis-glycol esters. The following are examples of suitable polyvalent alcohols: Ethylene glycol, propylene glycol-(1,2) and -(1,3), butylene glycol-(1,4) and -(2,3), hexanediol-(1,6), octanediol-(1,8), neopentylglycol, cyclohexanedimethanol (1,4-bis-hydroxymethylcyclohexane), 2-methyl-1,3-propanediol, glycerol, trimethylolpropane, hexanetriol-(1,2,6), butanetriol-(1,2,4), trimethylolethane, pentaerythritol, quinitol, mannitol and sorbitol, methylglycoside, diethylene glycol, triethylene glycol, tetraethylene glycol, polyethylene glycols, dipropylene glycol, polypropylene glycols, dibutylene glycol and polybutylene glycols. The polyesters may also contain a proportion of carboxyl end groups. Polyesters of lactones such as $\epsilon$-caprolactone or hydroxycarboxylic acids such as $\omega$-hydroxycaproic acid may also be used.

The polyethers used according to the invention which have at least 2, generally 2 to 8 and preferably 2 to 3 hydroxyl groups are also known per se and are prepared, for example, by polymerization of epoxides such as ethylene oxide, propylene oxide, butylene oxide, tetrahydrofuran, styrene oxide or epichlorohydrin, either each on its own, e.g. in the presence of borontrifluoride, or by addition of these epoxides, either as mixtures or successively, to starting components having reactive hydrogen atoms. Such starting components include water, alcohols, ammonia or amines, e.g. ethylene glycol, propylene glycol-(1,3) or —(1,2), trimethylolpropane, 4,4'-dihydroxydiphenylpropane, aniline, ethanolamine or ethylene diamine. Sucrose polyethers may also be used according to the invention, e.g. those described in German Auslegeschriften Nos. 1,176,358 and 1,064,938. It is in many cases preferred to use polyethers which contain predominantly primary hydroxyl groups (up to 90% by weight, based on all the hydroxyl groups present in the polyether). Polyethers modified with vinyl polymers, e.g. the compounds obtained by polymerization of styrene or acrylonitrile in the presence of polyethers as described in U.S. Pat. Nos. 3,383,351; 3,304,273; 3,523,093 and 3,110,695 and German Pat. No. 1,152,536, as well as polybutadienes which have hydroxyl groups are also suitable. Among the suitable polythioethers are the condensation products obtained by reacting thiodiglycol on its own and/or with other glycols, dicarboxylic acids, formaldehyde, aminocarboxylic acids or amino alcohols. The products obtained are polythio mixed ethers, polythio ether esters or polythio ether ester amides, depending on the cocomponents.

Suitable polyacetals include, for example, the compounds which can be prepared from glycols such as diethylene glycol, triethylene glycol, 4,4'-dioxethoxydiphenyl dimethylmethane, hexanediol and formaldehyde. Polyacetals suitable for the purpose of the invention may also be prepared by the polymerization of cyclic acetals.

The polycarbonates with hydroxyl groups used may be of the kind known per se, for example those which can be prepared by the reaction of diols such as propanediol(1,3), butanediol-(1,4) and/or hexanediol-(1,6), diethylene glycol, triethylene glycol or tetraethylene glycol with diarylcarbonates, e.g. with diphenylcarbonate or phosgene.

Suitable polyester amides and polyamides include, for example, the predominantly linear condensates prepared from polyvalent saturated and unsaturated carboxylic acids or their anhydrides and polyvalent saturated and unsaturated amino alcohols, diamines, polyamines and mixtures thereof.

Polyhydroxyl compounds already containing urethane or urea groups and modified or unmodified natural polyols such as castor oil, carbohydrates or starch may also be used. Addition products of alkylene oxides and phenol formaldehyde resins or of alkylene oxides and urea formaldehyde resins are also suitable for the purpose of the invention.

Representatives of these compounds which may be used according to the invention have been described, for example, in High Polymers, Vol. XVI, "Polyurethanes, Chemistry and Technology" by Saunders-Frisch, Interscience Publishers, New York, London, Volume I, 1962, pages 32 to 42 and pages 44 to 54 and Volume II, 1964, pages 5 to 6 and 198 to 199 and in Kunststoff-Handbuch, Volume VII, Vieweg-Hochtlen, Carl-Hanser-Verlag, Munich, 1966, pages 45 to 71.

Mixtures of the above mentioned compounds which contain at least two isocyanate-reactive hydrogen atoms and have a molecular weight of from 400 to 10,000 may, of course, also be used, for example mixtures of polyethers and polyesters.

The starting components used according to the invention may also include compounds with a molecular weight of from 32 to 400 which have at least two isocyanate-reactive hydrogen atoms. These compounds also contain hydroxyl groups and/or amino groups and/or thiol groups and/or carboxyl groups, preferably hydroxyl groups and/or amino groups. They serve as chain lengthening agents or cross-linking agents. They generally have from 2 to 8 isocyanate-reactive hydrogen atoms, preferably 2 or 3 such hydrogen atoms.

The following are examples of such compounds: Ethylene glycol, propylene glycol-(1,2) and —(1,3), butylene glycol-(1,4) and —(2,3), pentanediol-(1,5), hexanediol-(1,6), octanediol-(1,8), neopentyl glycol, 1,4-bis-hydroxymethylcyclohexane, 2-methyl-1,3-propanediol, glycerol, trimethylol propane, hexanetriol-(1,2,6), trimethylolethane, pentaerythritol, quinitol, mannitol and sorbitol, diethylene glycol, triethylene glycol, tetraethylene glycol, polyethylene glycols with a molecular weight of up to 400, dipropylene glycol, polypropylene glycols with a molecular weight of up to 400, dibutylene glycol, polybutylene glycols with a molecular weight of up to 400, 4,4'-dihydroxy-diphenyl propane, dihydroxymethylhydroquinone, ethanolamine, diethanolamine, triethanolamine, 3-aminopropanol, ethylene diamine, 1,3-diaminopropane, 1-mercapto-3-aminopropane, 4-hydroxyphthalic acid, 4-amino-phthalic acid, succinic acid, adipic acid, hydrazine, N,N-dimethylhydrazine, diaminodiphenylmethane, tolylene diamine, methylene-bis-chloroaniline, methylene-bis-anthranilic acid ester, diaminobenzoic acid esters and the isomeric chlorophenylene diamines.

Mixtures of various compounds having a molecular weight of from 32 to 400 and containing at least two isocyanate-reactive hydrogen atoms may be used.

Polyhydroxyl compounds containing high molecular weight polyadducts or polycondensates in a finely dispersed or dissolved form may also be used according to the invention. Such modified polyhydroxyl compounds are obtained when polyaddition reactions (e.g. reactions between polyisocyanates and aminofunctional compounds) or polycondensation reactions (e.g. between formaldehyde and phenols and/or amines) are carried out in situ in the above mentioned hydroxyl compounds. Processes of this kind have been described, for example, in German Auslegeschriften Nos. 1,168,075 and 1,260,142 and in German Offenlegungsschriften Nos. 2,324,134; 2,423,984; 2,512,385; 2,513,815; 2,550,796; 2,550,797; 2,550,833 and 2,550,862. They may also be prepared according to U.S. Pat. No. 3,869,413 or German Offenlegungsschrift No. 2,550,860 by mixing a previously prepared aqueous polymer dispersion with a polyhydroxyl compound and then removing water from the mixture.

When modified polyhydroxyl compounds of the kind mentioned above are used as starting components in the polyisocyanate polyaddition process, polyurethane resins having substantially improved mechanical properties are in many cases obtained.

As already mentioned above, readily volatile organic substances may be used as blowing agents for the production of polyurethane foams according to the invention. Suitable organic blowing agents include, for example, acetone, ethyl acetate and halogen-substituted alkanes such as methylene chloroform, ethylidene chloride, vinylidene chloride, monofluorotrichloromethane, chlorodifluoromethane, and dichlorodifluoromethane. Also suitable are butane, hexane, heptane and diethyl ether. The effect of a blowing agent can also be obtained by the addition of compounds which decompose at temperatures above room temperature to release gases such as nitrogen, e.g. azo compounds such as azoisobutyric acid nitrile. Further examples of blowing agents and the use of blowing agents have been described in Kunststoff-Handbuch, Volume VII, published by Vieweg and Hochtlen, Carl-Hanser-Verlag, Munich 1966, e.g. on pages 108 and 109, 453 to 455 and 507 to 510.

Catalysts are also frequently used according to the invention. The catalysts added are known per se. They include tertiary amines such as triethylamine, tributylamine, N-methylmorpholine, N-ethylmorpholine, N-cocomorpholine, N,N,N',N'-tetramethyl-ethylenediamine, 1,4-diazabicyclo-(2,2,2)-octane, N-methyl-N'-dimethylaminoethylpiperazine, N,N-dimethylbenzylamine, bis-(N,N-diethylaminoethyl)-adipate, N,N-diethylbenzylamine, pentamethyldiethylenetriamine, N,N-dimethylcyclohexylamine, N,N,N',N'-tetramethyl-1,3-butanediamine, N,N-dimethyl-$\beta$-phenylethylamine, 1,2-dimethylimidazole and 2-methylimidazole. Mannich bases known per se obtained from secondary amines such as dimethylamine and aldehydes, preferably formaladehyde, or ketones such as acetone, methyl ethyl ketone or cyclohexanone and phenols such as phenol, nonylphenol or bis-phenol may also be used as catalysts.

Examples of tertiary amines with isocyanatereactive hydrogen atoms which may be used as catalysts include triethanolamine, triiosopropanolamine, N-methyldiethanolamine, N-ethyl-diethanolamine, N,N-dimethylethanolamine and their reaction products with alkylene oxides such as propylene oxide and/or ethylene oxide.

Silaamines having carbon-silicon bonds as described e.g. in German Pat. No. 1,229,290, corresponding to U.S. Pat. No. 3,620,984, may also be used as catalysts, e.g. 2,2,4-trimethyl-2-silamorpholine or 1,3-diethylaminomethyltetramethyl-disiloxane.

Basic nitrogen compounds such as tetraalkylammonium hydroxides, alkali metal hydroxides such as sodium hydroxide, alkali metal phenolates such as sodium phenolate and alkali metal alcoholates such as sodium methylate may also be used as catalysts. Hexahydrotriazines are also suitable catalysts.

Organic metal compounds may also be used as catalysts according to the invention, in particular organic tin compounds.

The organic tin compounds used are preferably tin(II) salts of carboxylic acids such as tin(II) acetate, tin(II) octoate, tin(II) ethyl hexoate and tin(II) laurate and tin(IV) compounds such as dibutyl tin oxide, dibutyl tin dichloride, dibutyl tin diacetate, dibutyl tin dilaurate, dibutyl tin maleate or dioctyl tin diacetate. All the above mentioned catalysts may, of course, be used as mixtures.

Further examples of catalysts which may be used according to the invention and details concerning the activity of the catalysts are given in Kunststoff-Handbuch, Volume VII, published by Vieweg and Hochtlen, Carl-Hanser-Verlag, Munich 1966, e.g. on pages 96 to 102.

The catalysts are generally used in a quantity of between about 0.001 to 10% by weight, based on the total quantity of polyol components.

According to the invention surface active additives such as emulsifiers and foam stabilizers may also be used for the production of foams. Suitable emulsifiers include, e.g. the sodium salts of ricinoleic sulphonate or salts of fatty acids with amines such as oleic acid diethylamine or stearic acid diethanolamine. Alkali metal or ammonium salts of sulphonic acids such as dodecylbenzenesulphonic acid or dinaphthylmethane sulphonic acid or of fatty acids such as ricinoleic acid or of polymeric fatty acids may also be used as surface active additives.

Suitable foam stabilizers are particularly the polyether siloxanes, and especially those which are water soluble. These compounds generally have a polydimethyl siloxane group attached to a copolymer of ethylene oxide and propylene oxide. Foam stabilizers of this kind have been described, for example, in U.S. Pat. Nos. 2,834,748; 2,917,480 and 3,629,308.

Other additives which may also be used according to the invention include reaction retarders, e.g. substances which are acid in reaction such as hydrochloric acid or organic acid halides; cell regulators known per se such as paraffins or fatty alcohols or dimethyl polysiloxanes; pigments; dyes, flame retarding agents known per se such as tris-chloroethylphosphate, tricresyl phosphate or ammonium phosphate and polyphosphate; stabilizers against ageing and weathering; plasticizers; fungistatic and bacteriostatic substances; and fillers such as barium sulphate, kieselguhr, carbon black or whiting.

Other examples of surface active additives, foam stabilizers, cell regulators, reaction retarders, stabilizers, flame retarding substances, plasticizers, dyes, fillers and fungistatic and bacteriostatic substances which may be used according to the invention and details concerning the use and mode of action of these additives may be found in Kunststoff-Handbuch, Volume VII, published by Vieweg and Hochtlen, Carl-Hanser-Verlag, Munich 1966, e.g. on pages 103 to 113.

According to the invention, the components are reacted together by the known one-shot process, prepolymer process or semiprepolymer process, often using mechanical devices such as those described in U.S. Pat. No. 2,764,565. Details concerning processing apparatus which may also be used according to the invention may be found in Kunststoff-Handbuch, Volume VII, published by Vieweg and Hochtlen, Carl-Hanser-Verlag, Munich 1966, e.g. on pages 121 to 205.

According to the invention, the foaming reaction for producing foam products is often carried out inside molds. In this process, the foamable reaction mixture is introduced into a mold which may be made of a metal such as aluminum or a plastics material such as an epoxide resin. It foams up inside the mold to produce the shaped product. This process of foaming in molds may be carried out to produce a product having a cellular structure on its surface or it may be carried out to produce a product having a compact skin and cellular core. According to the invention, the desird result can be obtained by either introducing just sufficient foamable reaction mixture to fill the mold with foam after the reaction or introducing a larger quantity of reaction mixture than is necessary to fill the mold with foam. The second method is known as "overcharging", a procedure which has been disclosed, e.g. in U.S. Pat. Nos. 1,178,490 and 3,182,104.

So-called external mold release agents known per se, such as silicone oils, are frequently used when foaming is carried out inside molds. The process may also be carried out with the aid of so-called internal mold release agents, if desired in combination with external mold release agents, e.g. as disclosed in German Offenlegungsschriften Nos. 2,121,670 and 2,307,589.

Cold setting foams may also be produced according to the invention as described in British Pat. No. 1,162,517 and German Offenlegungsschrift No. 2,153,086.

Foams may, of course, also be produced by the process of block foaming or by the laminator process known per se.

Another commercially interesting use of the mixtures according to the invention of formoses and aminoplast monomers lies in impregnations and matrix reactions of preformed polyurethane foams of the kind described, for example, in German Offenlegungsschriften Nos. 1,911,643; 1,911,644; 1,911,645; 1,953,347; 2,031,160 and 2,037,613 and in the collective report by K. Wagner and M. Dahm in "Die Angewandte Chemie", Volume 21, 84 (1972), pages 1001 to 1008. For this purpose, prefabricated polyurethane flexible foam blocks are left to swell in the mixtures of the present invention so that the cellular structure of the foam is partly broken down. The excess liquid is then squeezed off and the mixture left in the polyurethane matrix is irreversibly fixed by means of a suitable hardening reaction, for example by reacting the urethane groups with the methylol groups of the aminoplast monomers or by charging the matrix with a liquid isocyanate in a second swelling operation and subsequently reacting the isocyanate with the hydroxyl groups of the formoses. Highly flame-resistant modified flexible foams are obtained in this way.

Mixtures of formoses and N-methylolated aminoplast monomers according to the invention and their condensates are also excellent binders for sawdust, wood waste and other biomasses containing cellulose or proteins. They may therefore be used for the manufacture of particleboard, if desired as mixtures with the above mentioned polyisocyanates.

As already mentioned above, the mixtures of formoses and aminoplast monomers according to the invention are stable in storage when mixed with waterglass (sodium or potassium silicate). These mixtures are generally prepared by adding from about 10 to 100 parts by weight of waterglass to 100 parts by weight of the mixture according to the invention. The resulting mixtures are also a subject matter of this invention. They are eminently suitable for use as binders and as starting components for the production of inorganic-organic foam resins by their reaction with polyisocyanates or with isocyanate prepolymers by the processes according to German Offenlegungsschriften Nos. 1,770,384; 2,359,606; 2,359,607; 2,359,608; 2,359,609; 2,359,610 and 2,359,611.

The mixtures of formoses and aminoplast monomers according to the invention, optionally as mixtures with phenoplast formers and/or additional aldehydes or ketones such as formaldehyde, n-butyraldehyde, isobutyraldehyde, acetone or benzophenone, etc., may, of course, also be used as starting components for the production of aminoplast resins.

When the mixtures according to the invention are used for the preparation of aminoplast condensated modified (softened) by polyhydroxyl compounds, the condensates obtained may be low molecular weight, oligomeric or high molecular weight. They may be highly branched or crosslinked, insoluble condensates, depending on the functionality of the components used. The degrees of condensation are determined by the functionalities of the aminoplast monomers and the carbonyl group content of the mixtures, especially the proportion of N-methylol compounds in the mixtures. In order to obtain water-soluble or water-dispersible, relatively low molecular weight condensates with molecular weights of up to 10,000, preferably between 240 and 2000, the ratio of the sum of all the hydroxyl group equivalents (including phenolic hydroxyl group equivalents) to the sum of all the carbonyl group equivalents and N-methylol group equivalents should preferably be between 5:1 and 5:3.5. The reaction is preferably carried out at a pH range of from 3 to 5.5 and at room temperature or temperatures up to 120° C., preferably 40° to 60° C., with simultaneous removal of the water of solution and condensation. Preferred acids are sulphuric acid, phosphoric acid and boric acid. Combinations of boric acid with the above mentioned inorganic acids or with organic acids with the above mentioned inorganic acids or with organic acids such as acetic acid, chloroacetic acid, trichloroacetic acid, maleic acid, etc. are particularly preferred. However, the condensation or partial condensation reactions can also be carried out, although much more slowly, by heat alone or in the presence of catalytic quantities of inorganic or organic bases. Under these conditions, molecular rearrangement reactions of the formoses and decomposition reactions of the sugars, mostly of an unknown nature, are more predominant.

If it is desired to prepare high molecular weight, cross-linked insoluble, hard masses, insoluble gels or humus-like condensates which can easliy be filtered, it is recommended to use a ratio of the sum of all hydroxyl equivalents to the sum of all carbonyl and N-methylol group equivalents of between 1:1 and 1:4. The pH should be maintained between 1 and 5 for more rapid aminoplast condensation and, if desired, the reaction may be accompanied by removal of the water of condensation and solution under vacuum.

The mixtures according to the invention of formoses and optionally N-methylolated aminoplast formers and the modified products obtained from them by acid or basic post-treatment or by a Maillard reaction are also excellent cocatalysts for the preparation of formoses by the condensation of formaldehyde carried out according to the process described at the beginning of this text. In addition, the products are suitable as mixing components for the higher molecular weight polyhydroxyl compounds described above and have been found to lead to improved compatibility of various polyols with each other and with the other components of a polyurethane formulation. This is particularly true if the formose/aminoplast monomer mixtures are modified by acid after-treatment accompanied by O-N-aminal formation.

The following Examples serve to explain the present invention. The quantities given are parts by weight or percentages by weight unless otherwise indicated.

EXAMPLES

EXAMPLE 1

81 g of an approximately 36% formose syrup (identical to the cocatalyst used in Example 1 of German Offenlegungsschrift 2,639,084) which is to be used as cocatalyst for the formose synthesis are dissolved in 2860 g of a 37% aqueous formaldehyde solution. 676 g of urea (11.2 mol) are then added with vigorous stirring. Owing to the large excess of formaldehyde (approximately 35 mol, based on 1 mol of urea put into the process), N-methylolation reactions to form monomethylolurea, N,N'-dimethylolurea and higher metholoated ureas with reduction in the formaldehyde content set in immediately at room temperature. After the addition of the urea N-methylolation is completed within 15 minutes by the addition of 6 g of potassium carbonate at pH 8.3 and 50° C. 20 g of lead (II) acetate are then added and the mixture is heated to 90° C. The reaction mixture is kept at a pH of 6.7 to 6.8 at this temperature for 8 hours by the continuous addition of 10% sodium hydroxide solution. At the end of this time, the N-methylol compounds of urea which were originally formed have been almost quantitatively converted into formoses and free urea, as shown by the analysis of parallel samples. When cold, the solution is first freed from lead(II) ions on a conventional acid ion exchanger and is then treated with a basic ion exchanger to free it from acetic acid and from acids which have been produced by crossed Cannizzaro reaction (formic acid, lactic acid, etc.).

After removal of the major proportion of water in a thin layer evaporator at 50° C. and 16 Torr, a formose-urea mixture which contains approximately 15% of water and has the surprisingly low viscosity of 650 mPas at 25° C. is obtained in a yield of 1995 g. An analogously prepared formose which is free from urea and has the same water content is found to have a viscosity of 4100 mPas at 25° C. The mixture according to the invention of formoses, aminoplast monomer and water (hereinafter referred to as "mixture A") contains approximately 51.7% by weight of formoses, 33.6% by weight of urea and 14.6% by weight of water and is particularly suitable for the production of novel, extremely flame-resistant, open celled, highly carbonizing rigid polyurethane foams.

The molar ratios of the various components in mixture A are as follows: 1 mol of formose:1.8 mol of urea:2.6 mol of water Mixture A is also a highly active cocatalyst for the preparation of formoses, e.g. from formalin solutions of any concentration in the presence of the usual catalysts or by conversion of the formaldehyde contained in the synthesis gases of large scale industrial formaldehyde production plants into formoses by the process according to German Offenlegungsschriften Nos. 2,721,093 and 2,721,186.

The formose contained in mixture A has a sugar content of 36.4% calculated as glucose.

A comparison solution of formose prepared by an analogous method and free from aminoplast monomers has a sugar content of 36.3% by weight, based on glucose with a molecular weight of 180. This result indicates that substantially no condensation reactions have taken place between urea and the aldo and keto functions of the formose in mixture A.

The formose in mixture A has the following distribution of components:
$C_2$-constituents: 0.5% by weight
$C_3$-constituents: 2.5% by weight
$C_4$-constituents: 4.7% by weight
$C_5$-constituents: 25.2% by weight
$C_6$-constituents: 46.2% by weight
$C_7$-constituents and higher molecular weight constituents: 21.8% by weight.

The OH number of formose having a water content of approximately 4% by weight is 1510, its average molecular weight is 166 and its average OH functionality is 4.68.

EXAMPLE 2

The procedure is analogous to that of Example 1 but the lead(II) acetate, potassium carbonate and sodium hydroxide solution are replaced by 70 g of calcium hydroxide. The condensation reaction is carried out at pH 8.5 to 9 in the presence of the quantity of urea mentioned in Example 1. When the reaction product has been worked up and completely desalted as in Example 1, a very low viscosity mixture of 51.2% formose, 33.8% urea and approximately 15% water is obtained. Its viscosity is only 580 mPas at 25° C. The sugar content is approximately 16.8% by weight, based on glucose with a molecular weight of 180. The lower sugar content may be attributed to the more vigorous crossed Cannizzaro reaction during formaldehyde condensation catalyzed with calcium hydroxide.

The formose in the mixture had the following distribution of components:
$C_2$ constituent: 1.16% by weight
$C_3$ constituent: 2.47% by weight
$C_4$ constituent: 10.08% by weight
$C_5$ constituent: 8.01% by weight
$C_6$ constituent: 28.25% by weight
$C_7$ constituent: 50.03% by weight The average molecular weight of the formose is 147, the average OH functionality approximately 4.1, the OH number 1485 and the sugar content 16.8, based on glucose with a molecular weight of 180. The low sugar content shows that approximately 62.2% of all the aldehyde and keto functions in the formose have been reduced to hydroxyl groups by crossed Cannizzaro reactions with formaldehyde.

(b) The same procedure as described under (a) is carried out except that the formose/urea mixture is not desalted. After filtration to remove traces of undissolved calcium formate and dehydration to a residual water content of 15%, it is surprisingly found that approximately 6.9% by weight of calcium formate, which is only sparingly soluble in water, are kept in solution in the formose/urea mixture which shows that the formose has a strong complex forming ability (yield 2130 g).

EXAMPLE 3

This example demonstrates that low viscosity mixtures according to the invention can also be prepared by simply dissolving aminoplast monomers in formose.

(a) 1024 Parts by weight of a 50% formose solution are mixed with 338 parts by weight of urea at 25° C. with stirring. The urea dissolves rapidly. Water is removed from the mixture in a thin layer evaporator at 55° C. and 15 Torr until the water content has been reduced to 15%. A mixture of 51.2% by weight of formose, 33.8% by weight of urea and 15% by weight of water is obtained. It has a viscosity of only 610 mPas at 25° C.

The formose used was prepared according to Example 2 of German Offenlegungsschrift 27 14 104 and has the following distribution of components:
$C_2$ constituents: 16.8% by weight
$C_3$ constituents: 21.0% by weight
$C_4$ constituents: 29.9% by weight
$C_5$ constituents: 25.1% by weight
$C_6$ constituents: 7.2 by weight
Average molecular weight: 104;
Average OH functionality: 2.3.

(b) The procedure described under (a) is employed but the urea used in (a) is replaced by 338 parts by weight of thiourea. The viscosity of the mixture which contains 15% of water is 540 mPas at 25° C.

(c) The procedure is as described under (a) but a formose having the following molecular distribution is used:
$C_2$ constituents: 3.3% by weight
$C_3$ constituents: 7.4% by weight
$C_4$ constituents: 16.5% by weight
$C_5$ constituents: 36.0% by weight
$C_6$ constituents: 27.0% by weight
$C_7$ constituents: 8.6% by weight
$C_8$ constituents: 1.2% by weight
Average molecular weight: 158;
Average OH functionality: 4.14;
Sugar content based on glucose with a molecular weight of 180:70% by weight.

The viscosity of the mixture of formose and urea containing 15% by weight of water is 779 mPas at 25° C.

The formose used in this case was prepared according to Example 1 of German Offenlegungsschrift No. 26 39 084, using 10 times the quantities of a semi-industrial process, but with the difference that the formation of formose was stopped at a residual formaldehyde content of 1.7% instead of 1.3% and the lead ions and potassium ions were removed by means of an ordinary commercial acid cation exchanger instead of the lead ions being precipitated with potassium carbonate. By employing this modification, the formose solution was completely freed from lead and potassium ions.

EXAMPLE 4

Example 3(c) is repeated except that urea is replaced by
(a) 338 parts by weight of dicyandiamide or
(b) 338 parts by weight of ε-caprolactam.
The procedure is otherwise as described for the concentration of mixtures in Example 3(a).

The viscosities of the mixtures containing 15% by weight of water are:
(a) 650 mPas at 25° C.
(b) 330 mPas at 25° C.

EXAMPLE 5

This example demonstrates with when the procedure according to Example 1 is employed, even N-methylolcaprolactam, which is a crystallized and clearly defined compound, surprisingly readily gives up its formaldehyde which is bound in the form of the methylol group. The formaldehyde is then converted into formose. The mixtures of formose and ε-caprolactam are distinguished by their exceptionally low viscosity and they are highly reactive with polyisocyanates.

The procedure is analogous to that of Example 1 but the 676 g of urea used there are replaced by 856 g of freshly prepared crystalline N-methylolcaprolactam (6 mol). 2375 g of a 37% aqueous formalin solution are used. The potassium carbonate added as N-methylolation catalyst in the first phase is omitted.

The viscosity of the formose-ε-caprolactam mixture is 415 mPas at 25° C. when it has a water content of 15% by weight.

When the mixture is dehydrated to a water content of 3.5% by weight, it still only has a viscosity of 5670 mPas at 35° C. Such mixtures are highly active catalysts for the production of flexible and rigid polyurethane foams.

EXAMPLE 6

A formose as prepared in Example 1 of German Offenlegungsschrift No. 2,639,084 is used as cocatalyst for the following formose syntheses in the presence of aminoplast monomers:

The procedure is analogous to that of Example 1 but urea is replaced by the following aminoplast monomers:
(a) 676 g of dicyandiamide
(b) 676 g of N,N-dimethylurea
(c) 676 g of an ethylene urea having the following formula

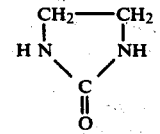

(d) 676 g of N,N-diethylurea
(e) 219 g of melamine
(f) 219 g of oxamide.

The resulting mixtures of the above mentioned aminoplast monomers with formose are evaporated to a water content of approximately 15% by weight. Mixtures which are highly fluid at room temperature, with viscosities below 800 mPas at 25° C., are obtained in all cases except (e) and (f). Mixture (e) is the only one which tends to crystallize at room temperature. This is due to the extremely low solubility of melamine.

EXAMPLE 7

The procedure is the same as in Example 1 but using 286 parts by weight of a 37% aqueous formaldehyde solution, 8.1 parts by weight of the 36% aqueous formose syrup as cocatalyst, 0.7 parts by weight of potassium carbonate as methylolation catalyst and 2 parts by weight of lead(II) acetate as formose catalyst. The condensation reaction is carried out in the presence of the following compounds:
 (a) 68 Parts by weight of imidazole,
 (b) 68 parts by weight of 1,2,4-triazole,
 (c) 68 parts by weight of 4-amino-triazole,
 (d) 68 parts by weight of a diurethane represented by the following formula:

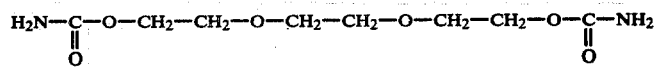

(e) 68 parts by weight of formamide,
 (f) 68 parts by weight of pyrrolidone-(2),
 (g) 68 parts by weight of guanidine carbonate.

In all variations (a) to (g), the reaction times and methods of working up are similar to those of Example 1. The formose/aminoplast monomer mixtures containing compositions (a) to (g) and containing approximately 15% of water are relatively low viscosity mixtures at 25° C.

EXAMPLE 8

This example shows that mixtures according to the invention of formoses and N-methylolated aminoplast monomers in which the viscosity is greatly reduced in comparison with the formose used can also be prepared quite easily by simply mixing formoses with previously formed
 (a) N-methylolcaprolactam or
 (b) N-methylolpyrrolidone.

The following are dissolved at room temperature, in each case in 500 g of a 50% aqueous, completely desalted formose solution prepared according to Example 1 of German Offenlegungsschrift No. 2,639,084;
 (a) 429 g of N-methylol caprolactam (3 mol) having the following formula:

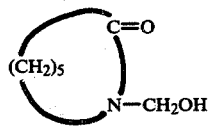

(b) 303 g of N-methylolpyrrolidone (3 mol) having the following formula:

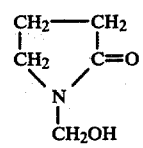

The resulting mixtures (a) and (b) are then concentrated by evaporation in a rotary evaporator at 55° C. and 15 Torr to reduce the water content to 1.5% by weight. Surprisingly low viscosity formose-N-methylolaminoplast monomer mixtures are obtained.
 (a)

$\eta_{35° C.} = 4700$ mPas $\eta_{25° C.} = 17600$ mPas (b)

$\eta_{35° C.} = 4300$ mPas $\eta_{25° C.} = 16900$ mPas

The viscosity of the formoses used as starting material, which have a water content of 1.5%, cannot be measured either at 25° C. or at 35° C. and is far above 500,000 mPas.

EXAMPLE 9

Variations (a) to (b) of this example illustrate the preparation of interesting N-methylol and N-polymethylol compounds in previously prepared formoses and also shows the exceptionally low viscosity of the resulting mixtures according to the invention.

In each case, 500 g of a 50% aqueous formose solution prepared according to Example 1 of German Offenlegungsschrift No. 26 39 084 are mixed in the completely desalted form (i.e. in the absence of formose catalysts) with 300 g of a 30% formalin solution (3 mol of formaldehyde). The following are then dissolved in this mixture:
 (a)
 1.8 g of potassium carbonate and
 228 g of thiourea (3 mol)
 (b)
 1.8 g of potassium carbonate and
 180 g of urea (3 mol)
 (c)
 1.8 g of potassium carbonate and
 339 g of ε-caprolactam (3 mol)
 (d)
 1.5 g of potassium carbonate and
 63 g of melamine (0.5 mol)

N-methylolation is carried out for 20 minutes at 55° C., in the case of (d) at 70° C.

The resulting mixtures (a) to (c) are then concentrated by evaporation in a rotary evaporator at 55° C. and 15 Torr. Surprisingly low viscosity mixtures are obtained in the following yields and with the following viscosities:
 (a) 614 g of a mixture of 41.4% of formose, 8% of water and 50.6% of

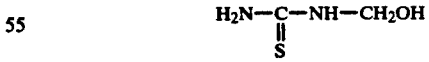

$\eta_{35° C.} = 957$ mPas; $\eta_{25° C.} = 2413$ mPas.
 (b) 561 g of a mixture of 44% of formose, 8% of water and 48% of N-methylolurea; $\eta_{35° C.} = 16140$ mPas; $\eta_{25° C.} = 72633$ mPas.
 (c) 687 g of a mixture of 62.2% N-methylol-caprolactam, 36.3% of formose and 1.5% of water; $\eta_{35° C.} = 4576$ mPas; $\eta_{25° C.} = 17305$ mPas.

Although approximately 62% by weight of N-methylol caprolactam, which is crystalline at room temperature, is formed in variation (c), the mixture according to the invention has a remarkably low viscosity compared with that of the unmodified formose, whose viscosity at 35° C. and with the same water content of 1.5% is not measurable (non-pourable sugar mixture).

When a formose having an average molecular weight of approximately 166 is used, the molar ratios in the mixtures according to the invention are as follows:

(a) 1 mol of formose; 2 mol of monomethylolthiourea and 1.8 mol of water;

(b) 1 mol of formose, 2 mol of monomethylolurea and 1.6 mol of water;

(c) 1 mol of formose, 2 mol of N-methylolcaprolactam and 0.54 mol of water.

When hexamethylolmelamine is formed in the formose solution, the mixture according to the invention shows a tendency to crystallization even at room temperature because hexamethylolmelamine, as is well known, is very sparingly soluble in water at room temperature.

Reaction mixture (d) is heated to 90° C. with boric acid as catalyst at pH 6 for 30 minutes. Etherification reactions of the hydroxyl groups of the formoses with the N-methylol groups of hexamethylolmelamine take place. A clear, non-crystallizing solution which is stable in storage and contains O, N-acetals of the sugars with melamine is obtained on cooling. The viscosity of the solution before it has been concentrated by evaporation is 95 mPas at 25° C. Concentration of the solution results in a clear, transparent solid resin with adhesive properties for wood and sawdust. It can be used, for example, as wood binder for the manufacture of particle-board.

Experiments carried out by the Applicants have shown that when isocyanate reactions take place, for example in the production of foams, monofunctional N-methylol compounds present in the mixtures according to the invention lead primarily to urethane formation. Interestingly, at temperatures above 100° C., they also lead to an additional decarboxylation and blowing reaction (masked blowing agents). This means that the N-monomethylol compounds become bifunctional isocyanate reactive components since decarboxylation produces a new basic, reactive center which is capable of addition reactions. All this may be represented by the following reaction scheme:

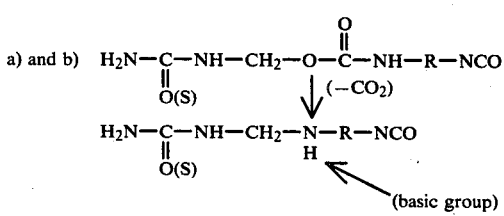

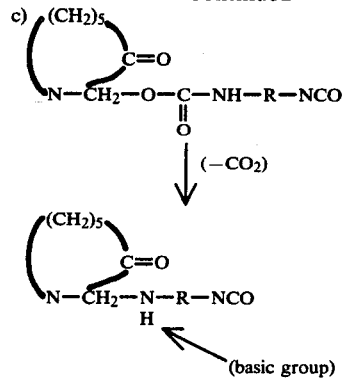

EXAMPLE 10

The procedure is the same as described under (a) and (b) of Example 9 but 600 g of the 30% formalin solution (6 mol) are used in each case. The solutions are concentrated to a water content of approximately 40% by weight by evaporation at a pH of 5.4 with the addition of 0.5 g of acetic acid. At this pH, etherification reactions already take place between the hydroxyl groups of formose and the N-methylol groups. A low viscosity solution is obtained in which, in addition to the starting components, the formoses are partially etherified through their OH groups in accordance with the following idealized structural formula, so that N-methylolether groups are formed:

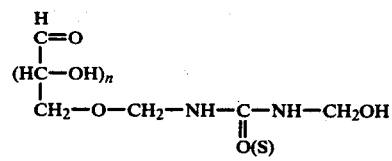

Aminoplast condensate mixtures prepared in this way according to the invention may also be used, for example, as binders for the manufacture of particle-board.

EXAMPLE 11

This example illustrates another possibility of preparing mixtures according to the invention. The synthesis of formose is first carried out to approximately 73.5% conversion, based on the formaldehyde put into the process, in the absence of aminoplast monomers. The remainder of the formaldehyde is bound by addition of the aminoplast formers in the presence of basic N-methylolation catalysts such as NaOH, KOH, calcium hydroxide or tertiary amines.

950 g of a 37% aqueous formaldehyde solution are reacted as described in Example 1 with 40 g of an aqueous 50% formose syrup as cocatalyst and 8 g of lead acetate as catalyst. The pH is kept at 6.5 to 6.7 by the addition of 10% sodium hydroxide solution within 20 minutes at 99° C. At this time, the residual formaldehyde content has been reduced to 9.75% by weight. The reaction mixture is then immediately cooled to below 45° C. and optionally desalted. At this temperature, no formose formation takes place. The 89 g of free formaldehyde (approximately 3 mol) still present in the solution are bound by the addition of (a) 180 g of urea (3 mol) and 1.5 g of dimethylbenzylamine; or (b) 339 g of ε-caprolactam (3 mol) and 1.8 g of endo-ethylene piperazine over a period of 10 minutes to bring about N-methylolation.

This process of N-methylolation is continued to completion by removal of the water in a thin layer evaporator at 45° C. and 14 Torr.

The formose mixtures prepared in this example have a substantially reduced average molecular weight (approximately 100) if the formation of formose is stopped at an early stage i.e. when the residual formaldehyde content is still almost 10%. The viscosities of mixtures (a) and (b) obtained according to the invention are exceptionally low, having the following values at 35° C.:

(a) 7500 mPas (water content approximately 8% by weight)

(b) 2300 mPas (water content approximately 1.5% by weight)

EXAMPLE 12

This example shows that the viscosity of the following can be greatly reduced by simply mixing
(a) α-aldolized formose,
(b) α-aldolized formose+D-glucose (1:1),
(c) α-aldolized formose+natural invert sugar (1:1),
(d) α-aldolized formose+sucrose (1:1) or
(e) α-aldolized formose+corn starch hydrolysate (1:1) with N-methylol caprolactam.

Preparation of α-aldolized formose and preparation of the mixtures according to the invention by a one-shot process:

(a) 500 g of a completely desalted aqueous solution containing 50% by weight of formose, which was prepared according to Example 1 of German Offenlegungsschrift No. 2,639,084 (250 g of formose solid content (approximately 1.5 mol) with an average molecular weight of approximately 166) are mixed with 150 g of a 30% formalin solution (approximately 1.5 mol of formaldehyde) and 10 g of triethylamine. The mixture is heated to 85° C. with stirring and the reduction in formaldehyde content is followed by titration with sodium sulphite. After only 45 minutes, the formaldehyde content of the solution has fallen from approximately 6.7% to 0.5% and α-aldolization is completed. The hot solution is clarified by the addition of 8 g of active charcoal and filtered. A solution which has only a slight yellow tinge is obtained. It mainly contains α-aldolized formoses represented by the following idealized formulae:

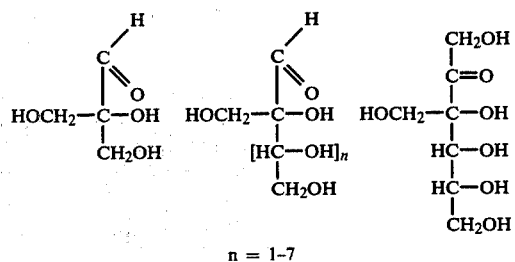

n = 1–7

-continued

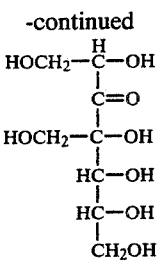

This controlled α-aldolization gives rise to formoses which contain an average of at least two primary hydroxyl groups per molecule and are more highly reactive with polyisocyanates than the formoses used as starting materials.

(a) The solution obtained is cooled to 40° C. 429 g of N-methylol-caprolactam (3 mol) are dissolved in this solution at pH 6.5. The resulting mixture is then concentrated to a water content of 2.9% by weight by evaporation in a rotary evaporator at 55° C. and 15 Torr. A surprisingly low viscosity mixture of α-aldolized formose and N-methylolcaprolactam is obtained. Its viscosity is 3500 mPas/35° C.

(b) The procedure is the same as described under (a) but 250 g of D-glucose are first dissolved in the α-aldolized formose, and then 858 g (6 mol) of N-methylolcaprolactam. Concentration of the solution to a water content of approximately 2.9% by weight by evaporation as under (a) yields a product with a viscosity of 6700 mPas/35° C.

(c) The procedure is the same as described under (a) but 250 g of natural invert sugar (honey) are first dissolved in the α-aldolized formose, followed by 858 g (6 mol) of N-methylolcaprolactam. After concentration of the solution to a water content of approximately 2.9% by weight by evaporation as under (a), a product having a viscosity of 5600 mPas/35° C. is obtained.

(d) The procedure is the same as under (a) but 250 g of sucrose are first dissolved in the α-aldolized formose, and then 858 g (6 mol) of N-methylolcaprolactam. After concentration of the solution to a water content of approximately 2.9% by weight by evaporation as under (a), a product with a viscosity of 9800 mPas/35° C. is obtained.

(e) The procedure is the same as under (a) but 250 g of a commercial enzymatically prepared sugar mixture of corn starch are first dissolved in the α-aldolized formose, and then 858 g (6 mol) of N-methylolcaprolactam. After concentration of the solution to a water content of approximately 2.9% by weight by evaporation as under (a), a product with a viscosity of 6100 mPas/35° C. is obtained.

The mixtures according to the invention prepared according to variation (a) to (e) are particularly interesting for the production of rigid polyurethane foams on account of their increased primary alcoholic group content (approximately two primary OH equivalents in the α-aldolized formose at an average molecular weight of approximately 198). When these mixtures are mixed with diethylphosphite or dimethylphosphite in proportions by weight of 2:1, the resulting mixtures have greatly reduced viscosities and are valuable additives for the production of flame resistant polyurethane foams.

EXAMPLE 13

This example demonstrates that mixtures according to the invention which have greatly reduced viscosities are obtained by simply dissolving urea in an aqueous solution of a formose with an average molecular weight of 166 according to Example 1 of German Offenlegungsschrift No. 2,639,084.

(a) 1.23 Mol of urea are dissolved in 332 g of the above mentioned 50% aqueous formose solution which contains 1 mol of formose with an average molecular weight of 166. The solution is evaporated to a water content of 3.9% in a rotary evaporator at 55° C. and 15 Torr. $\eta_{35°\,C.} = 80990$ mPas.

The viscosity of the formose used as starting material is so high at a water content of 3.9% that it cannot be measured at 35° C.

In this Example, the components have approximately the following molar ratios and the components are contained in the mixture in the following concentrations: 1 mol of formose:1.23 mol of urea:0.51 mol of $H_2O$; Concentrations: approx. 66.7% formose, 29.6% urea, 3.7% water.

(b) The procedure employed is the same as under (a) and a mixture containing the components in the following molar ratios is prepared:

1 mol of formose with an average molecular weight of 166, 1.17 mol of urea and 0.94 mol of water.

Concentrations: approx. 65.6% formose, 27.7% urea, 6.7% water $\eta_{25°} = 8322$ mPas When the formose used as starting material has a water content of approximately 6.6%, its viscosity is already so high that it cannot be measured at 25° C. Even at 50° C., the viscosity of this formose is approximately 26300 mPas.

(c) The procedure is the same as under (a) and a mixture containing the components in the following molar ratios and at the following concentrations is prepared:

Molar ratios: 1 mol of formose, 1.2 mol of urea, 1.87 mol of water;

Concentrations: approx. 61.1% formose, 26.5% urea, 12.4% water $\eta_{25°\,C.} = 944$ mPas.

The viscosity of the formose used as starting material is 25400 mPas at 25° C. when its water content is approximately 12.4%.

(d) The procedure is the same as under (a) and a mixture containing the components in the following molar ratios and concentrations is prepared:

Molar ratios: 1 mol of formose, 1.16 mol of urea, 5.63 mol of water;

Concentrations: approx. 49.3% of formose, 20.6% urea, 30% $H_2O$.

$\eta_{25°\,C.} = 26.3$ mPas.

The viscosity of the formose used as starting material is 88 mPas at 25° C. when the water content is 30%.

(e) The procedure is the same as under (a) and a mixture containing the components in the following molar ratios and at the following concentrations is prepared:

Molar ratios: 1 mol of formose, 4.72 mol of urea, 5.7 mol of water;

Concentrations: approx. 30.1% of formose, 51.3% of urea, 18.6% of water.

$\eta_{25°\,C.} = 19.2$ mPas.

The viscosity of the formose used as starting material is approximately 1888 mPas at 25° C. when the water content is 18.5%.

(f) The procedure is the same as under (a) and a mixture containing the components in the following molar ratios and at the following concentrations is prepared:

Molar ratios: 1 mol of formose, 5.52 mole of urea, 9.2 mol of water;

Concentrations: approx. 25.2% formose, 50.2% urea, 24.6% water.

$\eta_{25°\,C.} = 19$ mPas.

The viscosity of the formose used as starting material is approximately 239 mPas when its water content is 25%.

EXAMPLE 14

This example illustrates the technically highly interesting possibility of using the mixtures according to the invention for the production of extremely flame-resistant open-called, highly carbonizing polyurea-polyurethane-polybiuret rigid foams with isocyanate indexes of 45 to 50.

(a) 57 Parts by weight of mixture A described in Example 1, containing approximately 29.3 parts by weight of formose, approximately 19.4 parts by weight of urea and 8.3 parts by weight of water are mixed at 35° C. with 26 parts by weight of a copolyether of propylene oxide and ethylene oxide with OH number 28 which has been started on trimethylolpropane. This copolyether serving as elasticizing agent. The polyether contains 0.7 parts by weight of an emulsifier represented by the following formula:

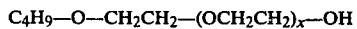

$$C_4H_9-O-CH_2CH_2-(OCH_2CH_2)_x-OH$$

(the average numerical value of x is 20).

After vigorous mixing of the above components, 1.2 parts by weight of a commercial silicone stabilizer (stabilizer OS 610 of Bayer AG).

0.2 parts by weight of endoethylene piperazine and 0.25 parts by weight of tin-II octoate are added.

149 parts by weight of a phosgenation product of a commercial aniline-formaldehyde condensate are then stirred in.

The polyisocyanate used has an isocyanate content of 29%. Formation of the foam is completed after 5 minutes with a very uniform rise time and without any signs of shrinkage. An open celled rigid foam containing predominantly urea and biuret groups and having a density of 28 kg/m³ is obtained.

Taking into account the NCO, OH, water and $NH_2$ equivalents used in the process, it is calculated that the rigid foam was produced with an index of approx. 45. Cut strips of rigid foam 2 cm in width, 1 cm in thickness and 10 cm in length cannot be ignited by full exposure to a Bunsen flame. The speed of propagation of the flame is therefore zero. No flame spread can be obtained by exposing the strip to the Bunsen burner for over 30 seconds. The burning process is merely accompanied by a carbonization of the foam and evolution of combustion gases which have a high water content.

(b) The procedure is the same as described under (a) but 5 parts by weight of the mixture of formose and N-methylol caprolactam described in Example 15 c is added. The reaction between isocyanate groups and water is pronounced and the system remains fluid for a longer time. A rigid foam with a density of 24 kg/cm³ and again excellent flame resistance is obtained.

(c) The procedure is the same as described under (a) but the 57 g of mixture A described in Example 1 are replaced by 57 g of mixture (b) of Example 9. Approximately 44% of formose, 8% of water and 48% of monomethylolurea, and 3 g of water are added to this mixture. The proportion of elasticizing polyether of the kind mentioned under (a) is increased to 60 g and the quantity of polyisocyanate to 156 g.

An elasticized, open celled rigid foam having a density of 23 kg/m$^3$ and excellent flame resistance is obtained. By extraction experiments carried out on the finished foam with water it can be demonstrated that N-methylolurea was fixed quantitatively in the polyurethane matrix.

EXAMPLE 15

120 Parts by weight of aluminum hydroxide (hydrate of alumina) are stirred into 2000 parts by weight of mixture A described in Example 1 to form a stable, nonsedimenting dispersion in the form of a paste. Rigid foams produced from this dispersion in accordance with Example 14 again have excellent flame resistance.

EXAMPLE 16

This example illustrates the use of the products according to the invention for carrying out matrix reactions according to the procedure described in German Patent 1,911,643.

The flexible polyurethane foam used as matrix was prepared as follows:

100 Parts by weight of a polypropylene glycol ether prepared from trimethylolpropane and 1,2-propylene glycol (molar ratio 1:1) as starter (OH number 47), 2.7 parts by weight of permethylated diethylene triamine and 0.23 parts by weight of a tin-(II) salt of 2-ethylcaproic acid were mixed together. 45.9 Parts by weight of an isomeric mixture of 80 parts by weight of 2,4-tolylenediisocyanate and 20 parts by weight of 2,6-tolylenediisocyanate were added and the components were initmately mixed by means of a high speed stirrer. The white, flexible foam obtained was to a large extent open celled and had a density of approximately 35 kg/m$^3$.

26.6 g of this flexible polyurethane foam in the form of a rectangular block (dimensions: 15 cm × 10 cm × 5 cm) were charged with a solution of 25 g of mixture (b) described in Example 9, which contains 44% of formose, 48% of N-mononethylolurea

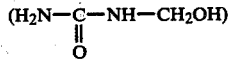

and 8% of water diluted in a mixture of 60 g of water, 8 g of formalin solution (30%) and 0.4 g of acetic acid. The foam block was compressed and released in the solution to enable it to absorb the solution. The block was then left to condense in a vacuum drying cupboard at 100° C. for 2 hours. An open celled, semi-rigid combination foam consisting of approximately 47% by weight of urea-formaldehyde-formose condensates is obtained. This novel foam is self-extinguishing and strongly carbonizing whereas the matrix has a high burning rate, of approximately 2 cm per second, as measured on a strip having a cross-section of 0.25 cm$^2$. The foam has a density of 68 kg/m$^3$.

EXAMPLE 17

This example illustrates the use of the products according to the invention for impregnating open-celled flexible polyurethane foams. The products according to the invention provide excellent flame resistance in the polyurethane foam without reacting to any significant extent with the urethane and urea groups of the polyurethane foam. They simply diffuse into the lamellae and cell webs of the matrix.

The preparation of the polyurethane foam used for impregnation has been described in Example 16.

26.6 g of the flexible polyurethane foam described in Example 16 was impregnated in the form of a rectangular block (dimensions: 15 cm × 10 cm × 5 cm) with a solution of 25 g of mixture (a) of Example 3. This mixture contained about 51.7% of formose, 33.6% of urea and 14.6% of water diluted in 55 g of water. The polyurethane foam block was compressed and then released to enable it to absorb the solution. The impregnated polyurethane foam block was then dried in a vacuum drying cupboard for 2 hours at 70° C. An impregnated foam containing approximately 17.4% of urea and approximately 44.3% of formose physically bound in the laminae and cell webs of the foam was obtained. This impregnated foam is self-extinguishing. When subjected to a flame, it undergoes carbonization due to the presence of formose and urea. On the other hand, the matrix used bursn at a high rate of approximately 2 cm per second, measured on a strip 0.25 cm$^2$ in cross-section.

If the polyurethane foam is impregnated in exactly the same manner but only on the surface of the block by spraying it with the mixture according to the invention mentioned above, the surface of the block becomes flame resistant and self-extinguishing.

What is claimed is:

1. Isocyanate reactive mixtures comprising
   (a) 10-95% by weight (based on a+b+c) of a mixture of polyhydric alcohols, hydroxyaldehydes and hydroxyketones obtained by the condensation of formaldehyde hydrate,
   (b) 5-80% by weight (based on a+b+c) of monomers capable of aminoplast formation or their N-methylolation products and
   (c) 0-80% by weight (based on a+b+c) of water.

2. The mixtures of claim 1 which comprise
   (a) 20-80% by weight (based on a+b+c) of a mixture of polyhydric alcohols, hydroxyaldehydes and hydroxyketones obtained by the condensation of formaldehyde hydrate,
   (b) 20 to 70% by weight (based on a+b+c) of monomers capable of aminoplast formation or their N-methylolation products and
   (c) 0.3-50% by weight (based on a+b+c) of water.

3. The mixtures of claim 1 which comprise from 0.8 to 35% by weight of water.

4. The mixtures of claim 1 wherein the ratio by weight of components (a) to (b) is between 20:1 and 1:2.

5. The mixtures of claim 4 wherein the ratio by weight of components (a) to (b) is between 10:1 and 1:1.

6. The mixtures of claim 1 which comprise 0.5 to 6 mol of component (b) and 0.3 to 10 mol of component (c) per mol of component (a).

7. The mixtures of claim 1 which comprise 1 to 3 mol of component (b) and 1 to 5 mol of component (c) per mol of component (a).

8. The mixtures of claim 1 wherein component (b) is selected from the group consisting of urea; N-monomethylolurea; N,N'-dimethylolurea; thiourea; N-monomethylol thiourea; N,N'-dimethylolthiourea; dicyandiamide; melamine; and the methylolation products of melamine; ε-caprolactam and/or N-methylol-ε-caprolactam.

9. The mixtures of claim 1 which comprise up to 100% by weight, based on the sum of components a, b and c, of monosaccharides and/or disaccharides.

10. The mixtures of claim 9 which comprise from 10 to 50% by weight, based on the sum of components a, b and c, of monosaccharides and/or disaccharides.

11. The mixtures of claim 1 which comprise from 10 to 100% by weight, based on sum of components (a), (b) and (c), of waterglass.

12. The mixtures of claim 1 which comprise from 5 to 15% by weight, based on the sum of components (a), (b) and (c), of calcium formate.

13. A process comprising condensing aqueous formalin solutions and/or paraformaldehyde dispersions containing from 20 to 65% by weight of formaldehyde at pH values of between 4 and 9 and at a reaction temperature of from 70° C. to 110° C. in the presence of soluble or insoluble salts of metals of the 2nd to 4th Main Group or 1st to 8th sub-Group of the Periodic System of Elements or in the presence of metal ions bound to a high molecular weight carrier, and in the presence of compounds capable of enediol formation, the condensation reaction being carried out in the presence of compounds which are capable of aminoplast function and, if desired, subsequently removing excess water in known manner.

14. A process for the preparation of low molecular weight polyhydric alcohols, hydroxyaldehydes and hydroxy ketones comprising condensing aqueous formalin solutions and/or paraformaldehyde dispersions containing from 20–65% by weight of formaldehyde at pH values of between 4 and 9 and at a reaction temperature of from 70° C. to 110° C. in the presence of soluble or insoluble salts of metals of the 2nd to 4th Main Group or 1st to 8th sub-Group of the Periodic System of Elements or in the presence of metal ions bound to a high molecular weight carrier and in the presence of compounds capable of enediol formation, until the reaction has proceeded to 40 to 95% conversion of the formaldehyde put into the process; binding the residual formaldehyde by a N-methylolation reaction by the addition of compounds capable of aminoplast formation; and, if desired, subsequently removing excess water in known manner.

15. A process comprising dissolving compounds which are capable of aminoplast formation or their N-methylol compounds in an aqueous solution of a mixture of low molecular weight polyhydric alcohols, hydroxyaldehydes and hydroxyketones, which mixture has been obtained by the autocondensation of formaldehyde hydrate.

16. The process of claim 15 wherein formaldehyde is added to the mixture so that the compounds capable of aminoplast formation are converted into their N-methylol derivatives, and the excess quantity of water is subsequently removed in known manner if desired.

17. In a process for the production of cellular or non-cellular polyurethane resins by the reaction of
(A) polyisocyanates with
(B) polyhydroxyl compounds having a molecular weight below 400, optionally
(C) polyhydroxyl compounds having a molecular weight between 400 and 10,000 and optionally other isocyanate reactive compounds, optionally in the presence of
(D) blowing agents, catalysts, fillers and other known additives,
the improvement which comprises using as component (B) isocyanate reactive mixtures comprising
(a) 10–95% by weight (based on a+b+c) of a mixture of polyhydric alcohols, hydroxyaldehydes and hydroxyketones obtained by the condensation of formaldehyde hydrate,
(b) 5–80% by weight (based on a+b+c) of monomers capable of aminoplast formation or their N-methylolation products and
(c) 0–80% by weight (based on a+b+c) of water.

18. The process of claim 17 wherein a mixture containing 4 to 25% by weight of water is used as component (B), from 0 to 100% by weight of component (C), based on the quantity of (B), is used, and the isocyanate index is from 20 to 70.

19. The process of claim 18, wherein a mixture containing from 8 to 20% by weight of water is used as component (B), from 10 to 50% by weight, based on (B), of component (C) is used, and the isocyanate index is from 30 to 60.

20. The process of claim 17 wherein a mixture containing from 0 to 4% by weight of water is used as component (B), from 0 to 100% by weight, based on (B), of component (C) is used, an isocyanate index of from 20 to 70 is used, and a low boiling organic liquid is added as blowing agent.

21. The process of claim 20, wherein a mixture containing from 0.7 to 3% by weight of water is used as component (B), from 10 to 50% by weight, based on (B), of component (C) is used, and an isocyanate index of from 30 to 60 is used.

22. The process of claim 17, wherein polyisocyanates are reacted with a mixture of 5 to 30% by weight of component (B) and 70 to 95% by weight of component (C) at an index of 70 to 130.

23. The process of claim 22, wherein polyisocyanates are reacted at an isocyanate index of between 90 and 120 with a mixture of
5–20% by weight of the mixtures of claim 1 or condensation products obtained by acid or basic modification of said mixtures of claim 1 and
80–95% by weight of polyether polyols having a molecular weight of 1000 to 6000, which mixture contains
2.5 to 6% by weight (based on the whole polyol component) of water.

24. A process for the manufacture of particle-board comprising blending and reacting materials containing lignocellulose and binder, the improvement wherein the binder is isocyanate reactive mixtures comprising
(a) 10–95% by weight (based on a+b+c) of a mixture of polyhydric alcohols, hydroxyaldehydes and hydroxyketones obtained by the condensation of formaldehyde hydrate,
(b) 5–80% by weight (based on a+b+c) of monomers capable of aminoplast formation or their N-methylolation products and
(c) 0–80% by weight (based on a+b+c) of water.

* * * * *